United States Patent [19]

Matsui

[11] Patent Number: 4,847,145
[45] Date of Patent: Jul. 11, 1989

[54] FILM FOR KEEPING FRESHNESS OF VEGETABLES AND FRUIT

[76] Inventor: Mitsuo Matsui, 1226, Nishisawarago-cho, Ashikaga-shi, Tochigi-ken, Japan, 326

[21] Appl. No.: 75,066

[22] Filed: Jul. 17, 1987

[51] Int. Cl.$^4$ .................... B05D 3/00; B05D 7/00; C08K 3/04
[52] U.S. Cl. .................... 428/323; 428/338; 428/477.7; 428/480; 428/521; 428/522; 428/523; 55/16; 523/200; 523/215; 523/216
[58] Field of Search ............... 428/323, 338, 521, 522, 428/523; 523/200, 215, 216

[56] References Cited

U.S. PATENT DOCUMENTS

| 3,947,373 | 3/1976 | Sobajima et al. ............ 523/200 X |
| 4,082,880 | 4/1978 | Zboril ............ 428/323 X |
| 4,192,792 | 3/1980 | Sugarman et al. ............ 523/200 X |
| 4,399,179 | 8/1983 | Minami et al. ............ 428/323 X |
| 4,564,647 | 1/1986 | Hayashi et al. ............ 523/200 X |

Primary Examiner—P. C. Ives
Attorney, Agent, or Firm—Cushman, Darby & Cushman

[57] ABSTRACT

Disclosed is a film for keeping freshness of vegetables and fruit which has an ethylene-adsorptive activity. The film preferably contains a fine-porous material. According to the film, the ethylene gas evolved from vegetables and fruit can be very effectively removed and thus freshness of vegetables and fruit can be maintained.

3 Claims, 3 Drawing Sheets

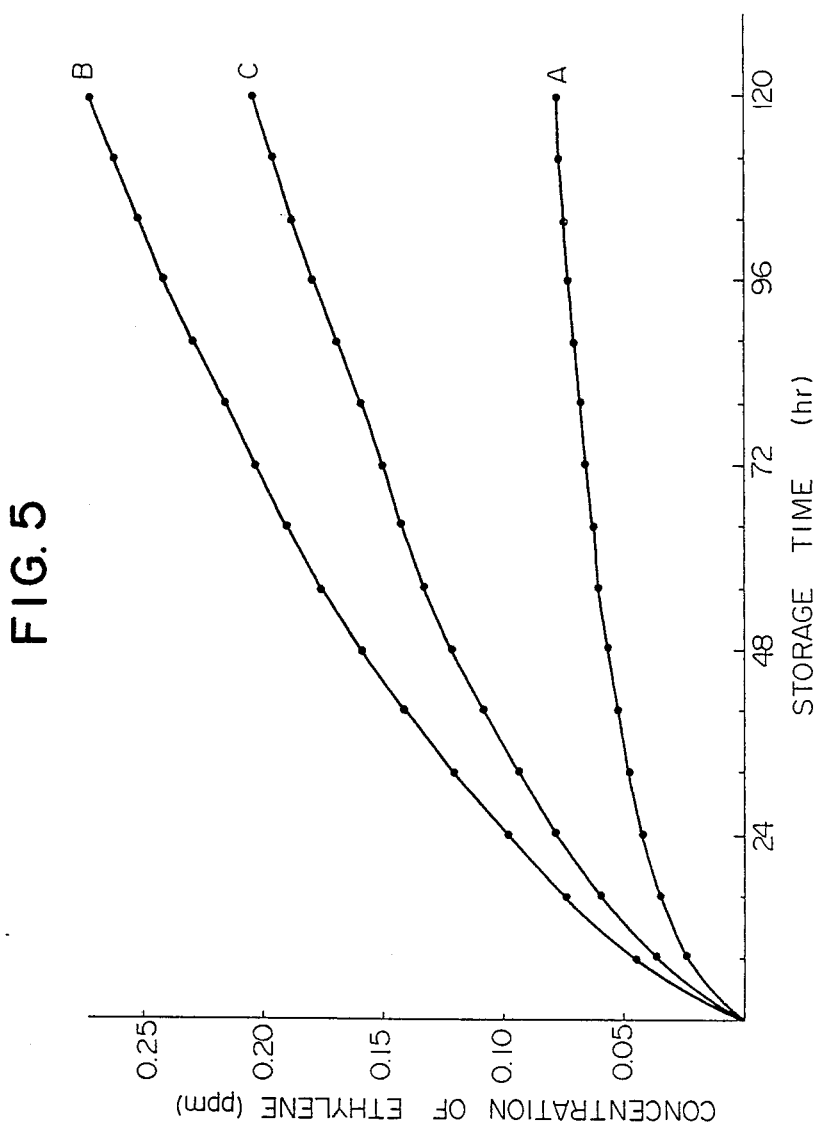

FILM FOR KEEPING FRESHNESS OF VEGETABLES AND FRUIT

BACKGROUND OF THE INVENTION

1. Technical Field

The present invention relates to a film used for wrapping vegetables and fruit, particularly to a film for wrapping vegetables and fruit which adsorbs an ethylene gas to exert an excellent effect for keeping freshness of vegetables and fruits.

2. Background Information

It has hitherto been known that the storage condition of vegetables and fruit depends upon the amount of the resulting ethylene gas evolved from themselves, and that the time for which freshness of vegetables and fruit is freshly maintainable can be remarkably prolonged by removing the ethylene gas in a storage house, when vegetables and fruit are stored.

Vegetables and fruit themselves evolve the ethylene gas to ripen. In a sealed storage house, the concentration of ethylene evolved from vegetables and fruit themselves is increased. As a result, their ripeness is enhanced and their freshness is rapidly decreased.

Therefore, in order to keep freshness of vegetables and fruit, it is an important problem to depress the evolution of ethylene and to remove the evolved ethylene gas.

For example, Japanese Patent Publication No. 55-50451/1980 discloses a material for storing vegetables and fruits, keeping their freshness by removing the ethylene gas, wherein bromine is adsorbed in carbon having fine pores of a few angstrom diameter.

However, the material for keeping the freshness as described in the above specification is placed in a storage house and intended to remove the whole ethylene gas therein. Accordingly, a large quantity of the material for keeping the freshness is required. Moreover, it is difficult to remove ethylene completely. In particular, the ethylene gas which is considerably high in concentration stays on the surface of each of vegetables and fruit. It is extremely difficult to remove this ethylene gas completely. It has been, therefore, extremely difficult to keep freshness of vegetables and fruit for a long period of time.

Also, when a small amount of vegetables and fruit are stored, there have been problems that the operation requires much time and is complicated, and that the storage cost becomes high, because the material for keeping the freshness must be placed in a storage house each time.

SUMMARY OF THE INVENTION

It is therefore a primary object of the present invention to solve such problems in the prior art, namely, to provide a film for keeping freshness of vegetables and fruit which can effectively maintain the freshness with ease.

In accordance with the present invention, there is provided a film for keeping freshness of vegetables and fruit which has an ethylene-adsorptive activity.

BRIEF DESCRIPTION OF THE DRAWINGS

FIGS. 1 to 5 are graphs each showing the relationships between the storage time of vegetables and fruit and the amount of ethylene remaining on the surfaces of vegetables and fruit.

DESCRIPTION OF THE PREFERRED EMBODIMENTS

Figure 1:
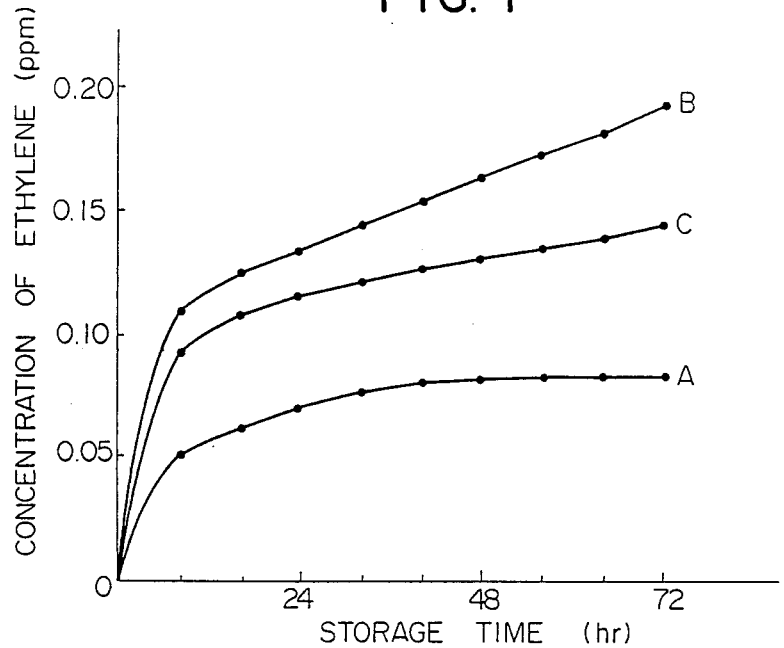

In the present invention, the ethylene-adsorptive activity means a property for adsorbing ethylene. The film of the present invention is desirable to have an ability to adsorb ethylene at a rate of at least 0.005 ppm per hour-square meter.

The film having such an ethylene-adsorptive activity can be obtained by adding a fine-porous material into the film. The fine-porous material is an inorganic material having a number of fine pores of 2 to 2,800 angstrom diameter, and there can be exemplified pumice-tuff, zeolite, active carbon, cristobalite, clinoptilolite and the like. Further, the finely divided fine-porous material may be sintered together with a slight amount of a metal oxide before it is added to the film. The fine-porous material may be added into the film in such a manner that the fine-porous material ground to a fine powder is incorporated into a polymer for the film by the conventional method and then the polymer is formed to the film. The size of the fine powder of the fine-porous material is preferable to be at least 200 mesh and the amount thereof contained in the film is desirable to be at least 1% by weight.

It is suitable to treat the fine-porous material previously with oxygen under an action of electro-magnetic waves or ozone, because the ethylene-adsorptive activity is improved.

In addition, the film containing the fine-porous material not only has the ethylene-adsorptive activity, but also is excellent in permeability to gases such as oxygen, carbon dioxide, nitrogen, ethylene, steam or the like. Consequently, the ethylene gas is discharged outside the film wrapping vegetables and fruit, and the inside of the film is maintained at a suitable humidity. Therefore, the effect of keeping freshness of vegetables and fruit is heightened.

As a material for the film of the present invention, there can be used polyethylene, polypropylene, polybutadiene, polyvinyl acetate, a polyester, a polyamide or the like. A material having chlorine atoms such as polyvinyl chloride or polyvinylidene chloride, or a material containing a plasticizer is preferable not to be used, because of being liable to cause an insufficient ethylene-adsorptive activity.

Using the film of the present invention, the ethylene gas evolved on the surfaces of vegetables and fruits can be very effectively removed and thus freshness of vegetables and fruits can be maintained, when the vegetables and fruit are wrapped in such a manner that the film is in direct contact with the surfaces thereof.

Further, the film of the present invention is economical, because it is enough only to wrap vegetables and fruit with the film and a special storage house is not required.

For example, the film of the present invention is suitable for the storage of a small amount of vegetables and fruit in the home or the like.

The present invention will now be described in detail with reference to the following examples that by no means limit the scope of the invention.

Example 1

Pumice-tuff was ground to a powder having a size of at least 200 mesh, and incorporated in polyethylene in an amount of 5 % by weight. Thus, a 40μ-thick film was formed therefrom.

The film was tested using spinach immediately after the harvest, three sets each consisting of five heads of healthy ones were selected. Each of them was perpendicularly stood in a resinous cylindrical container. One set was wrapped with the film described above and sealed, and stored in a storage house at a temperature of 15° to 25° C.

For comparison, one of the remaining two sets was wrapped with the commercial polyethylene film and sealed, and the other was not wrapped. Both were stored in a storage house at a temperature of 15° to 25° C.

With respect to each of samples, the concentrations of ethylene found on the surfaces of the spinach were measured over 3 days from the beginning of the storage. The results thereof were as shown in FIG. 1. As apparent from the results shown in FIG. 1, when the film of the present invention was used (curve A), the evolved ethylene gas was adsorbed to the film and only a small amount of ethylene remained on the surfaces of the spinach. However, when the commercial polyethylene film was used (curve B) and when not wrapped (curve C) large amounts of ethylene remained on the surfaces of the spinach.

After the lapse of 3 days from the beginning of the storage, the condition of each spinach sample was observed. When the film of the present invention was used, only two leaves were discolored to yellowish brown by decomposition of chlorophyll. In contrast, when the commercial polyethylene film was used, seven leaves were discolored, and when not wrapped, four leaves were discolored. Moreover, when the film of the present invention was used, the inside of the film was maintained at a suitable humidity. However, when the commercial polyethylene film was used, the inside of the wrapping film became moist, and when not wrapped, the spinach began to wither.

Example 2

To a powder of cristobalite, there were added a small amount of quartz, $TiO_2$, $Al_2O_3$, $Fe_2O_3$, CaO and $Na_2O$, and clay was prepared by mixing them. The clay was granulated, preliminarily dried at a temperature of about 100° C. and then sintered at a temperature of 700° C. The granules thus sintered were treated with oxygen under irradiation of electro-magnetic waves in the range of 1849 to 2537 angstroms.

The materials thus treated was thereafter ground to a powder having a size of at least 200 mesh and incorporated in polyethylene in an amount of 5% by weight. Then, a 40μ-thick film was formed therefrom.

The chemical composition (% by weight) of the material obtained by the oxygen treatment was as follows:
$SiO_2$ ... 87.335, $TiO_2$ ... 0.21, $Al_2O_3$ ... 5.19, $Fe_2O_3$ ... 1.64,
CaO ... 0.27, MgO ... 0.555 $Na_2O$ ... 0.255, $K_2O$ ... 0.745.
Besides, there were contained 0.1 ppm of Ge, 30 ppm of Cr and 50 ppm of Pb as trace components.

Spinach immediately after the harvest was wrapped with this film and sealed in a similar manner as in Example 1, and stored in a storage house at a temperature of 15° to 25° C.

For comparison, spinach wrapped with the commercial polyethylene film and not wrapped were stored in a storage house at a temperature of 15° to 25° C.

For each sample, the concentrations of ethylene existing on the surfaces of the spinach were measured as is the case with Example 1. The results thereof were as shown in FIG. 2.

Figure 2:
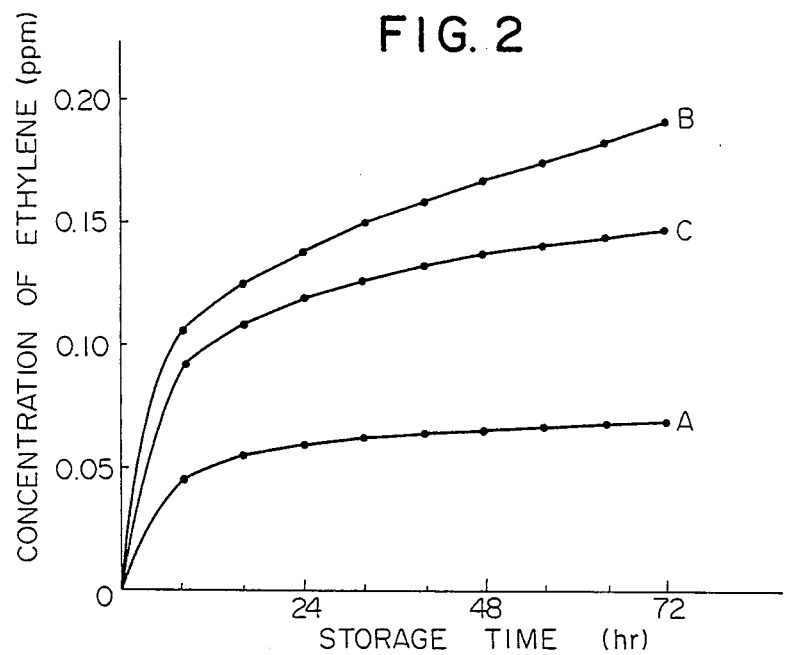

As apparent from the results shown in FIG. 2, when the film of the present invention was used (curve A), the evolved ethylene gas was adsorbed by the film and only a very small amount of ethylene remained on the surfaces of the spinach. However, when the commercial polyethylene film was used (curve B) and when not wrapped (curve C), large amounts of ethylene remained on the surfaces of the spinach.

After the lapse of 3 days from the beginning of the storage, the condition of each spinach sample was observed. When the film of the present invention was used, only one leaf was discolored to yellowish brown by decomposition of chlorophyll. In contrast, when the commercial polyethylene film was used, eight leaves were discolored, and when not wrapped, four leaves were discolored. Moreover, when the film of the present invention was used, the inside of the film was maintained at a suitable humidity. However, when the commercial polyethylene film was used, the inside of the film became moist, and when not wrapped, the spinach began to wither.

Example 3

Zeolite was ground to a powder having a size of at least 200 mesh and incorporated in polybutadiene in an amount of 10% by weight. Then, a 40μ-thick film was formed therefrom.

The film was testing using strawberries immediately after the harvest; three sets each consisting of nine strawberries which were uniform in weight and healthy were selected. One set was wrapped with the film above described and sealed, and stored in a storage house at a temperature of 15° to 25° C.

For comparison, one of the remaining two sets was wrapped with the polybutadiene film supplied by Japan Synthetic Rubber Co., Ltd. and sealed, and the other was not wrapped. Both were stored in a storage house at a temperature of 15° to 25° C.

With respect to each of samples, the concentrations of ethylene found on the surfaces of the strawberries were measured over 2 days from the beginning of the storage. The results thereof were as shown in FIG. 3.

Figure 3:
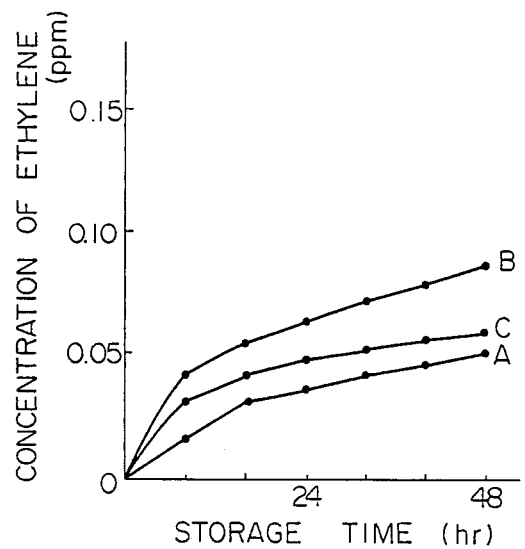

As apparent from the results shown in FIG. 3, when the film of the present invention wherein zeolite was incorporated was used (curve A), the evolved ethylene gas was adsorbed to the film and only a small amount of ethylene remained on the surfaces of the strawberries. However, when the commercial polybutadiene film was used (curve B), and when not wrapped (curve C), large amounts of ethylene remained on the surfaces of the strawberries.

After the lapse of 2 days from the beginning of the storage, the condition of each strawberry sample was observed. When the film of the present invention was used, rot was found in only one strawberry. In contrast, when the commercial polybutadiene film was used, six strawberries had rotted, and when not wrapped, four strawberries had rotted.

Moreover, when the film of the present invention was used, the inside of the film wrapping the strawberries was maintained at a suitable humidity. However, when the commercial polybutadiene film was used, the inside of the wrapped film became moist, and when not wrapped, the strawberries began to wither.

Example 4

Instead of zeolite in Example 3, zeolite treated with oxygen under an action of ozone was incorporated in the polybutadiene film. The experiments were repeated under the same condition as these of Example 3. The results thereof were as shown in FIG. 4.

Figure 4:
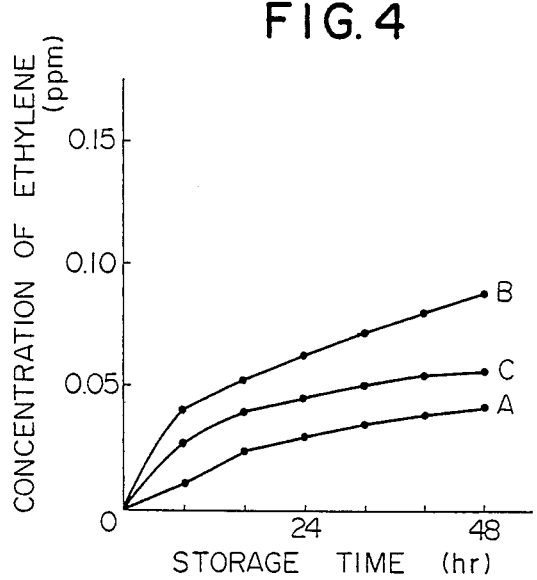

As apparent from the results shown in FIG. 4, when the film of the present invention wherein zeolite treated with oxygen was incorporated was used (curve A), the evolved ethylene gas was adsorbed by the film and only a very small amount of ethylene remained on the surfaces of the strawberries. However, when the polybutadiene film free from zeolite treated with oxygen was used (curve B), and when not wrapped (curve C), large amounts of ethylene remained on the surfaces of the strawberries.

After the lapse of 2 days from the beginning of the storage, the condition of each strawberry sample was observed. When the film of the present invention, rot was not found in any strawberry. In contrast, when the commercial polybutadiene film was used, six strawberries were rotted, and when not wrapped, three strawberries were rotted.

Moreover, when the film of the present invention was used, the inside of the film wrapping the strawberries was maintained at a suitable humidity. However, when the commercial polybutadiene film was used, the inside of the wrapping film became stuffy, and when not wrapped, the strawberries began to wither.

Example 5

Zeolite treated with oxygen of Example 4 was incorporated in polypropylene in an amount of 7% by weight, and then a 40μ-thick film was formed therefrom.

The film was tested using broccoli immediately after the harvest; three sets each consisting of six broccoli heads which were relatively uniform in weight and healthy were selected in such a manner that each set was approximately the same in the total weight. One set of broccoli was wrapped with the film above described and sealed and stored in a storage house at a temperature of 15° to 25° C.

For comparison, one of the remaining two sets was wrapped with the commercial polypropylene film for wrapping and sealed, and the other was not wrapped. Both were stored in a storage house at a temperature of 15° to 25° C.

With respect to each of samples, the concentrations of ethylene found on the surfaces of the broccoli were measured over 5 days from the beginning of the storage. The results thereof were as shown in FIG. 5.

As apparent from the results shown in FIG. 5, when the film of the present invention in which zeolite was incorporated was used (curve A), the evolved ethylene gas was adsorbed by the film and only a very small amount of ethylene remained on the surfaces of the broccoli. However, when the commercial polypropylene film was used (curve B), and when not wrapped (curve C), large amounts of ethylene remained on the surfaces of the broccoli.

After the lapse of 5 days from the beginning of the storage, the condition of each broccoli sample was observed. When the film of the present invention was used, the broccoli were only slightly discolored and the buds thereof were only slightly swollen. In contrast, when the commercial polypropylene was used, brown discoloration began to appear on the broccoli and the buds were swollen, and when not wrapped, the broccolis turned yellow and the buds were swollen.

Moreover, when the film of the present invention was used, the inside of the film wrapping the broccoli was maintained at a suitable humidity. However, when the commercial polypropylene film was used, the inside of the wrapping film became moist, and when not wrapped, the broccoli began to become limp.

What is claimed is:

1. A polymer film capable of adsorbing ethylene at a rate of at least 0.005 ppm per hour per square meter for maintaining the freshness of vegetables and fruit, said polymer film comprising a polymer mixed with a fine-porous material which has been treated with oxygen in the presence of electromagnetic irradiation or ozone, said polymer being selected from the group consisting of polyethylene, polypropylene, polybutadiene, polyvinyl acetate, polyesters and polyamides, said fine-porous material being selected from the group consisting of pumice-tuff, zeolite, active carbon, cristobalite and clinoptilolite, and mixed and sintered with a metal oxide selected from the group consisting of $SiO_2$, $TiO_3$, $Al_2O_3$, $Fe_2O_3$, $CaO$, $Na_2O$ and mixtures thereof.

2. Polymer film according to claim 1, wherein said polymer film contains at least 1% by weight of said fine-porous material.

3. Polymer film according to claim 1, wherein said fine-porous material is at least 200 mesh.

* * * * *